United States Patent
Walsh et al.

[11] 3,722,948
[45] Mar. 27, 1973

[54] MULTI-TRANSPORT SYSTEM

[76] Inventors: David P. Walsh; Joanne M. Walsh, both of 1400 Ramsey Drive, Edgewater, Md. 21037

[22] Filed: Nov. 18, 1970

[21] Appl. No.: 90,667

Related U.S. Application Data

[63] Continuation-in-part of Ser. No. 873,001, Oct. 31, 1969.

[52] U.S. Cl.................296/35 A, 214/517, 280/34 A
[51] Int. Cl. ................................................B60p 3/42
[58] Field of Search ......296/10, 35 A, 1 R; 280/34 A; 214/515, 517; 105/366 R

[56] References Cited

UNITED STATES PATENTS

| | | | |
|---|---|---|---|
| 3,473,679 | 10/1969 | Weichel | 214/515 X |
| 1,521,156 | 12/1924 | Jenkins | 296/35 A |
| 2,970,550 | 2/1961 | Petterson | 105/366 R X |
| 3,508,762 | 4/1970 | Pratt | 280/34 A X |
| 2,461,577 | 2/1949 | Stark | 296/10 X |
| 2,498,906 | 2/1950 | Apperson | 296/35 A |

FOREIGN PATENTS OR APPLICATIONS

| | | | |
|---|---|---|---|
| 410,005 | 5/1910 | France | 105/366 R |
| 1,080,210 | 12/1954 | France | 214/517 |

*Primary Examiner*—Leo Friaglia
*Assistant Examiner*—John A. Pekar
*Attorney*—E. Barron Batchelder

[57] ABSTRACT

A multi-use transport system including a trailer having a main chassis frame and a plurality of interchangeable type trailer bodies each of which is mounted on a substantially identical sub-frame, the sub-frame and main chassis frame being so interrelated and designed for coacting cooperative interengagement of each said body type sub-frame with the main chassis frame. Each trailer type body is mountable selectively on an identical trailer main chassis, permitting variable multiple function use of a single trailer.

10 Claims, 20 Drawing Figures

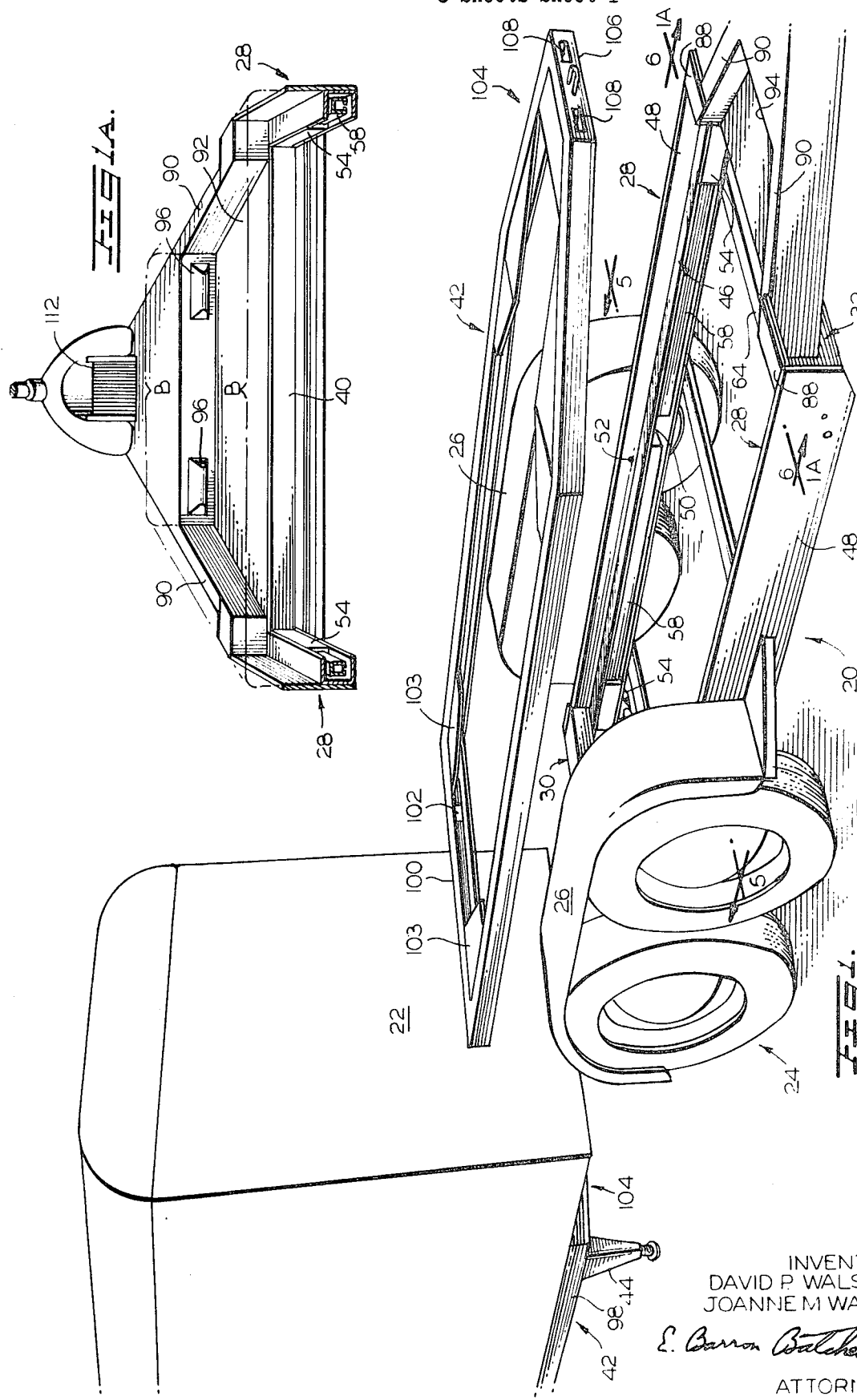

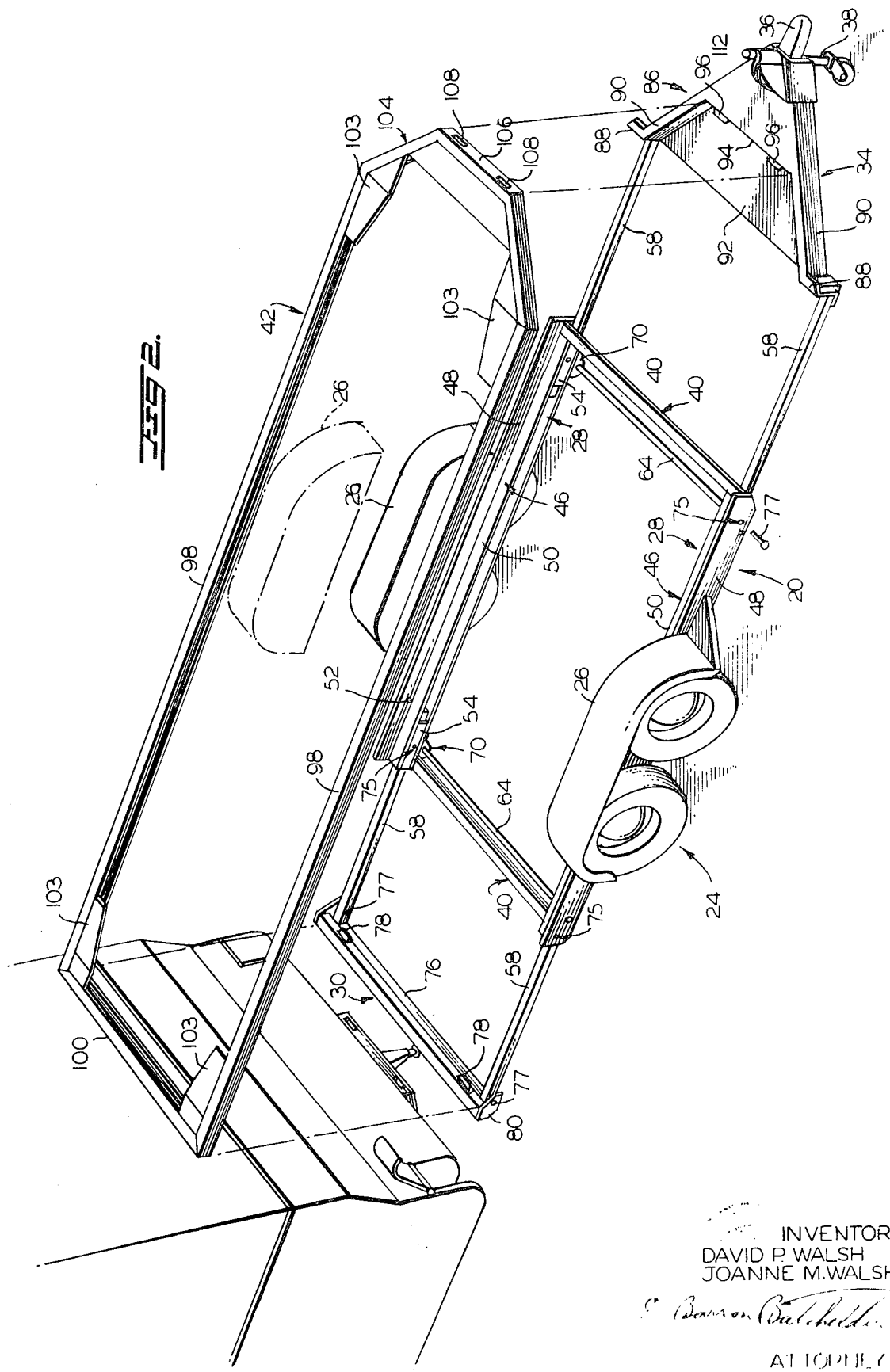

Patented March 27, 1973 3,722,948
8 Sheets-Sheet 3
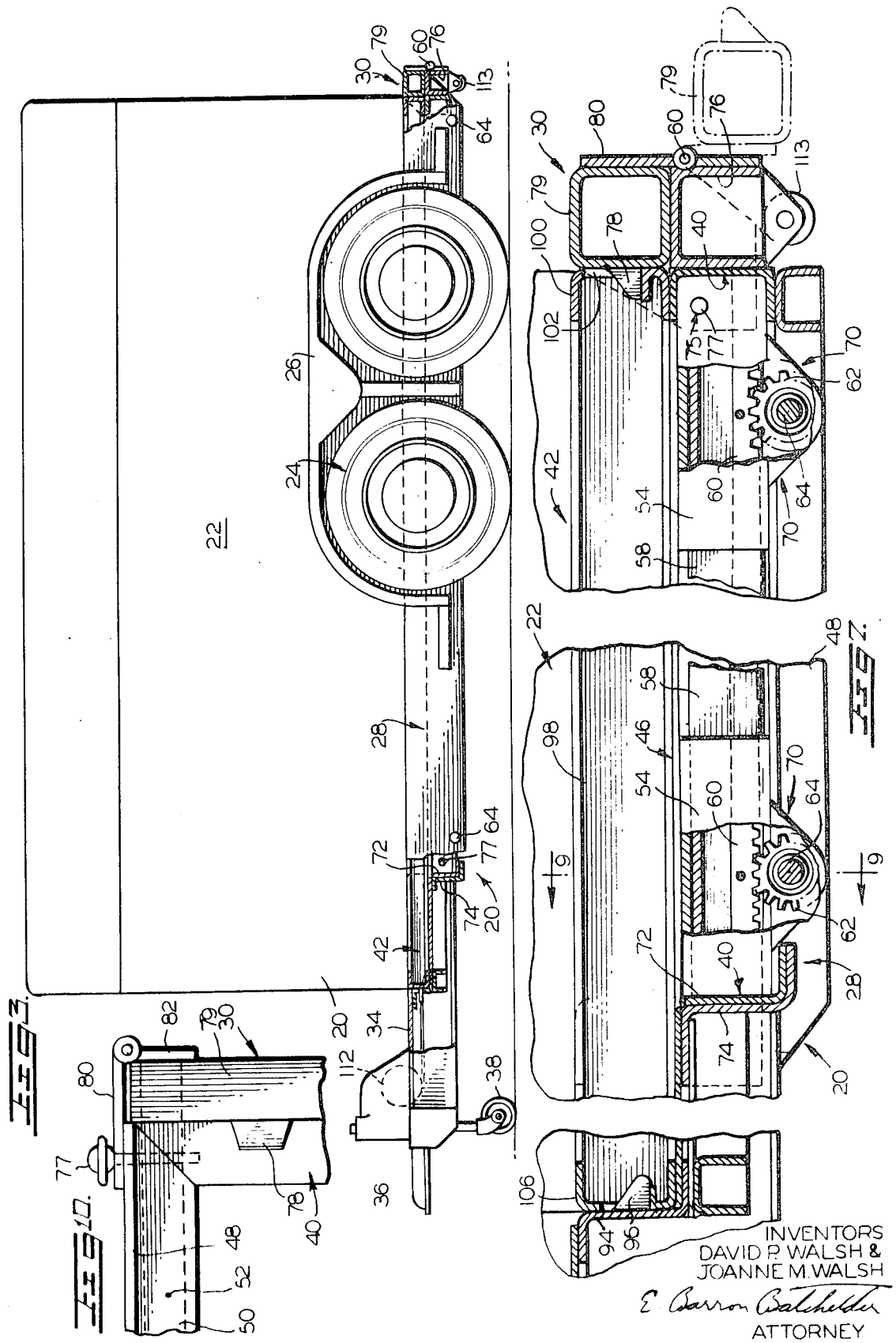
INVENTORS
DAVID P. WALSH &
JOANNE M. WALSH
E. Barron Batchelder
ATTORNEY

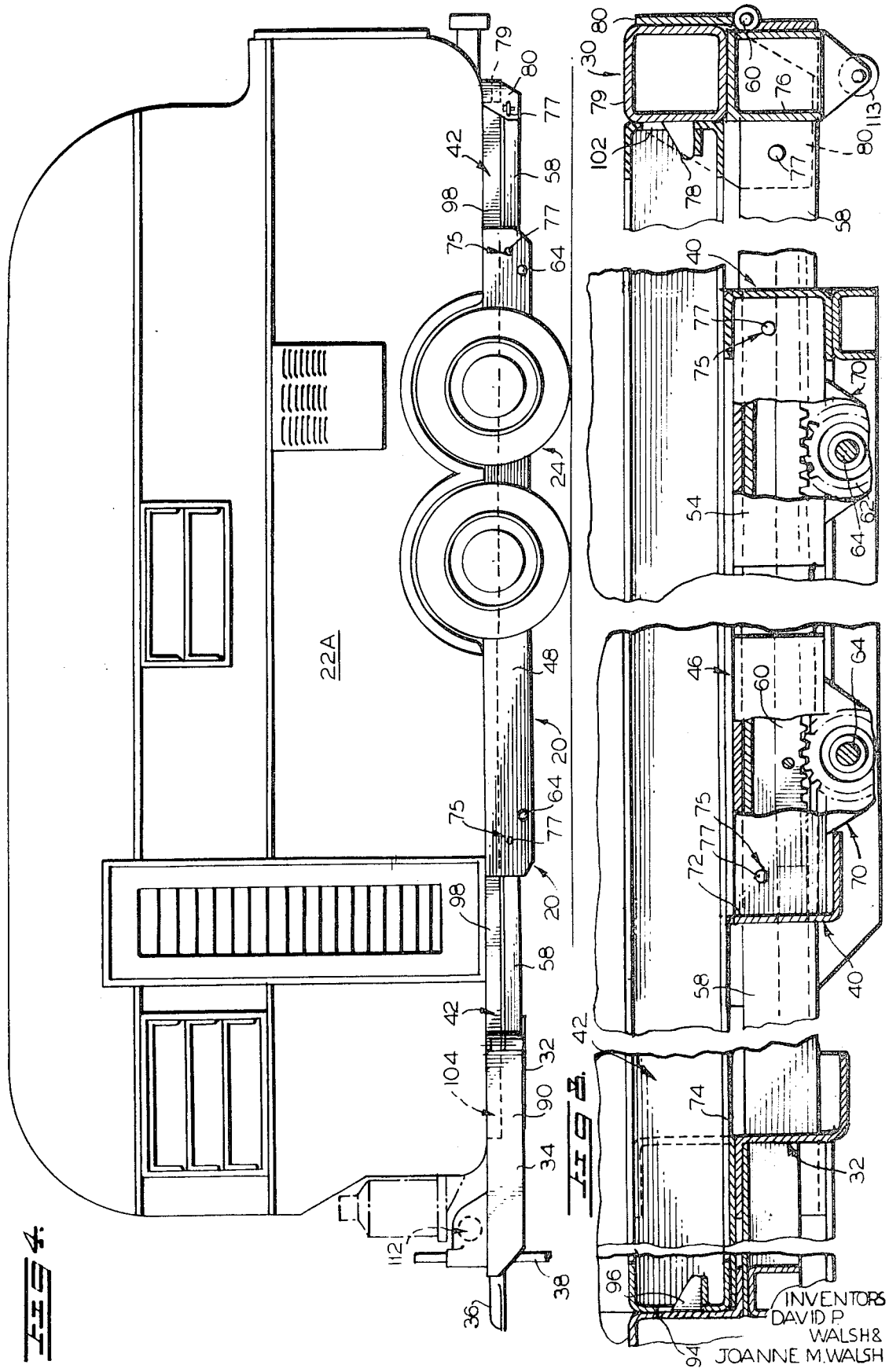

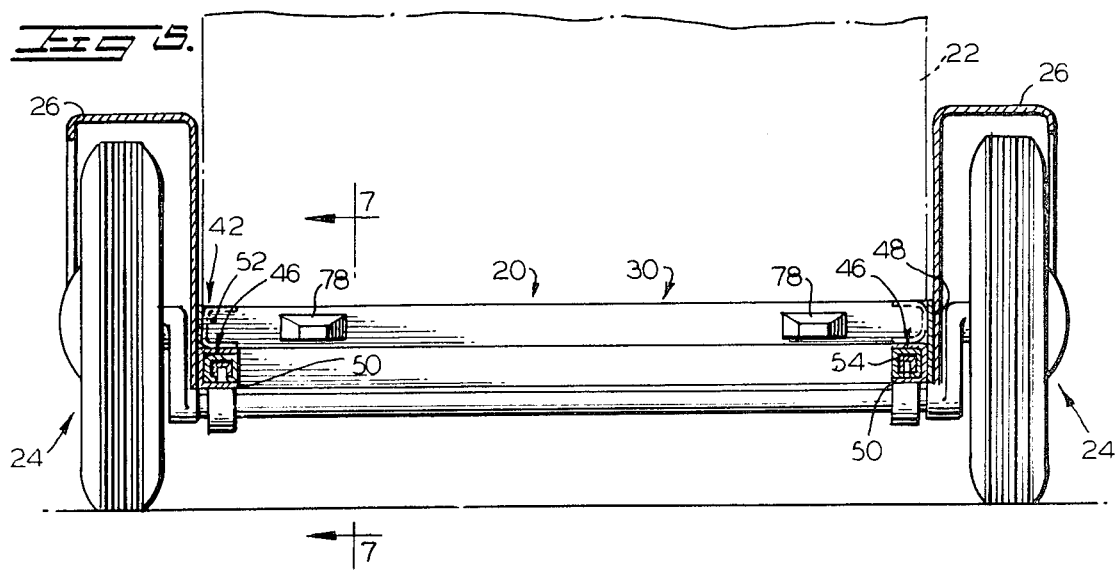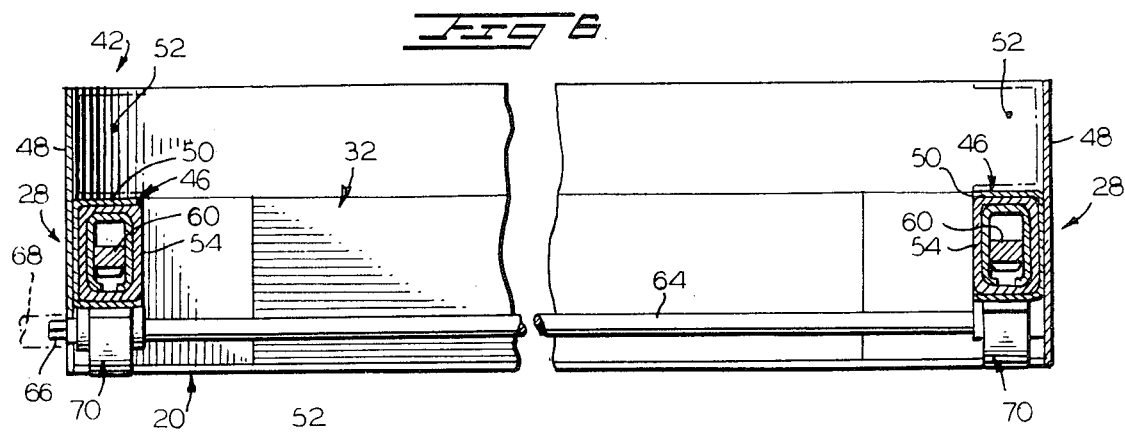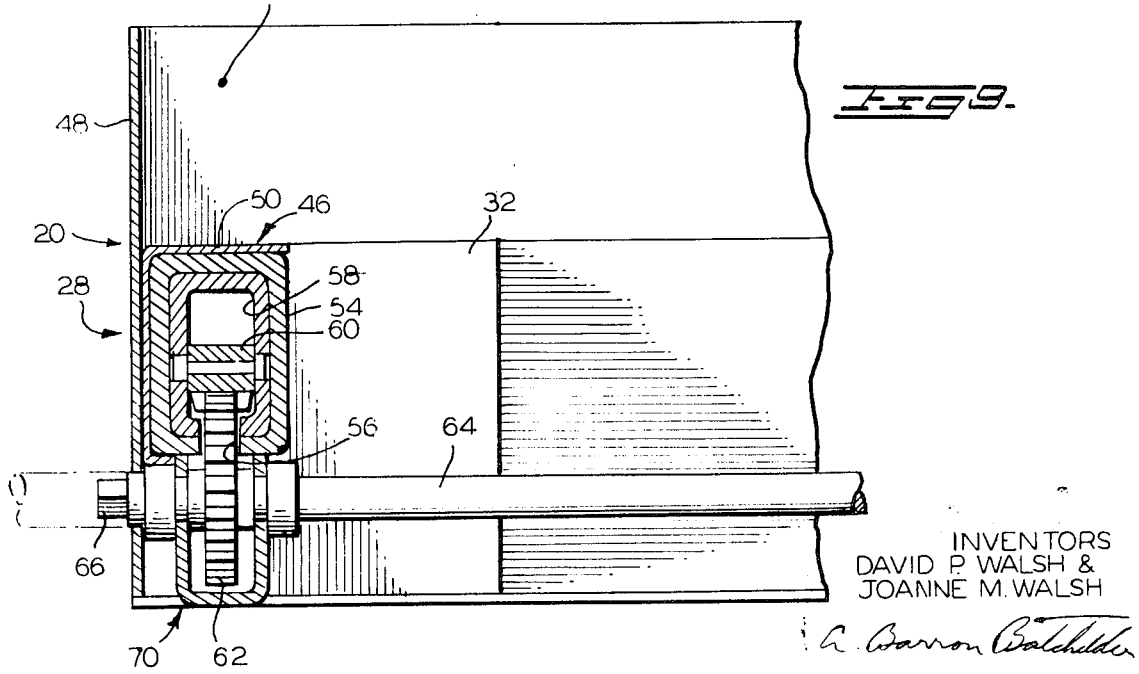

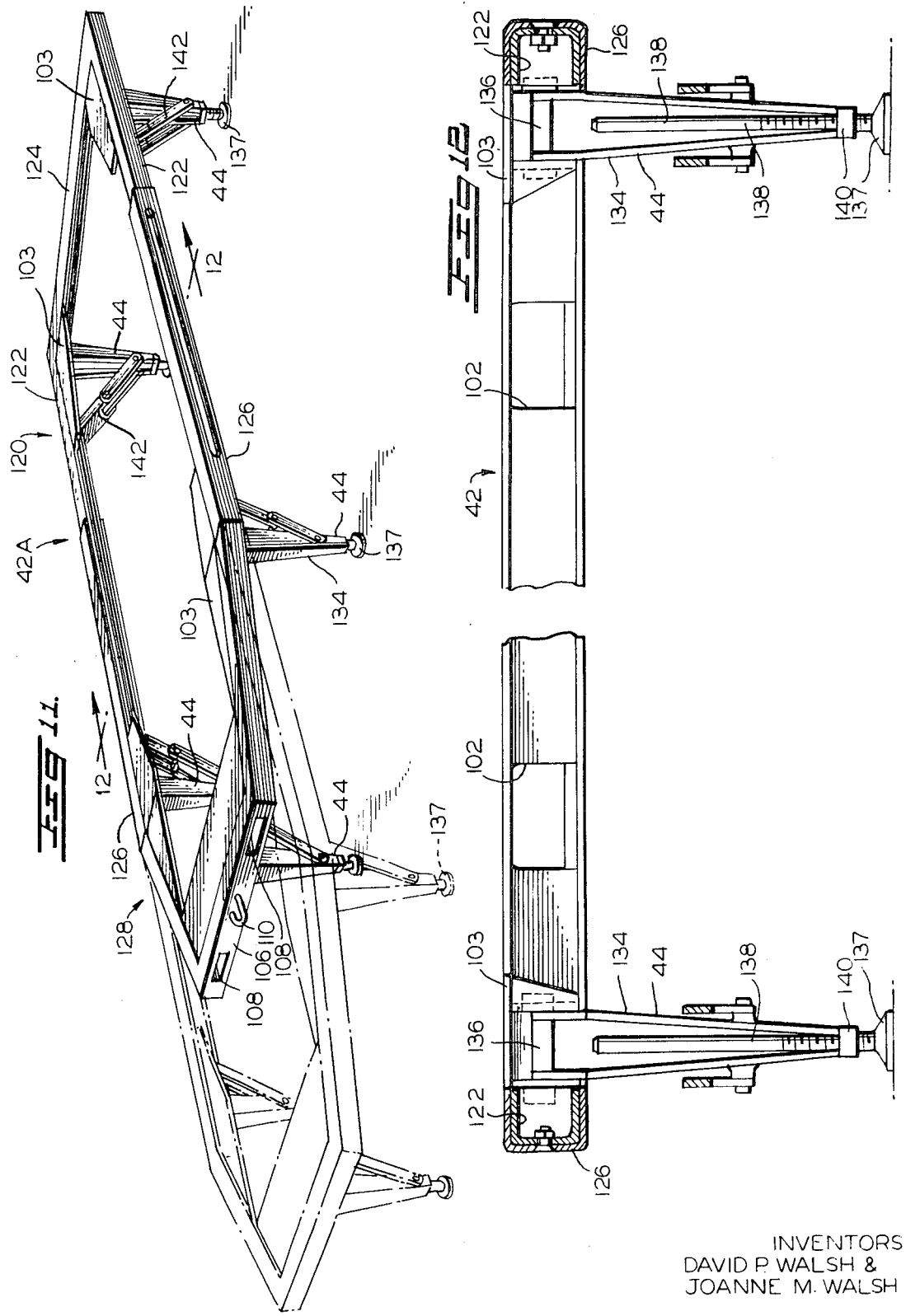

Patented March 27, 1973 3,722,948
8 Sheets-Sheet 7
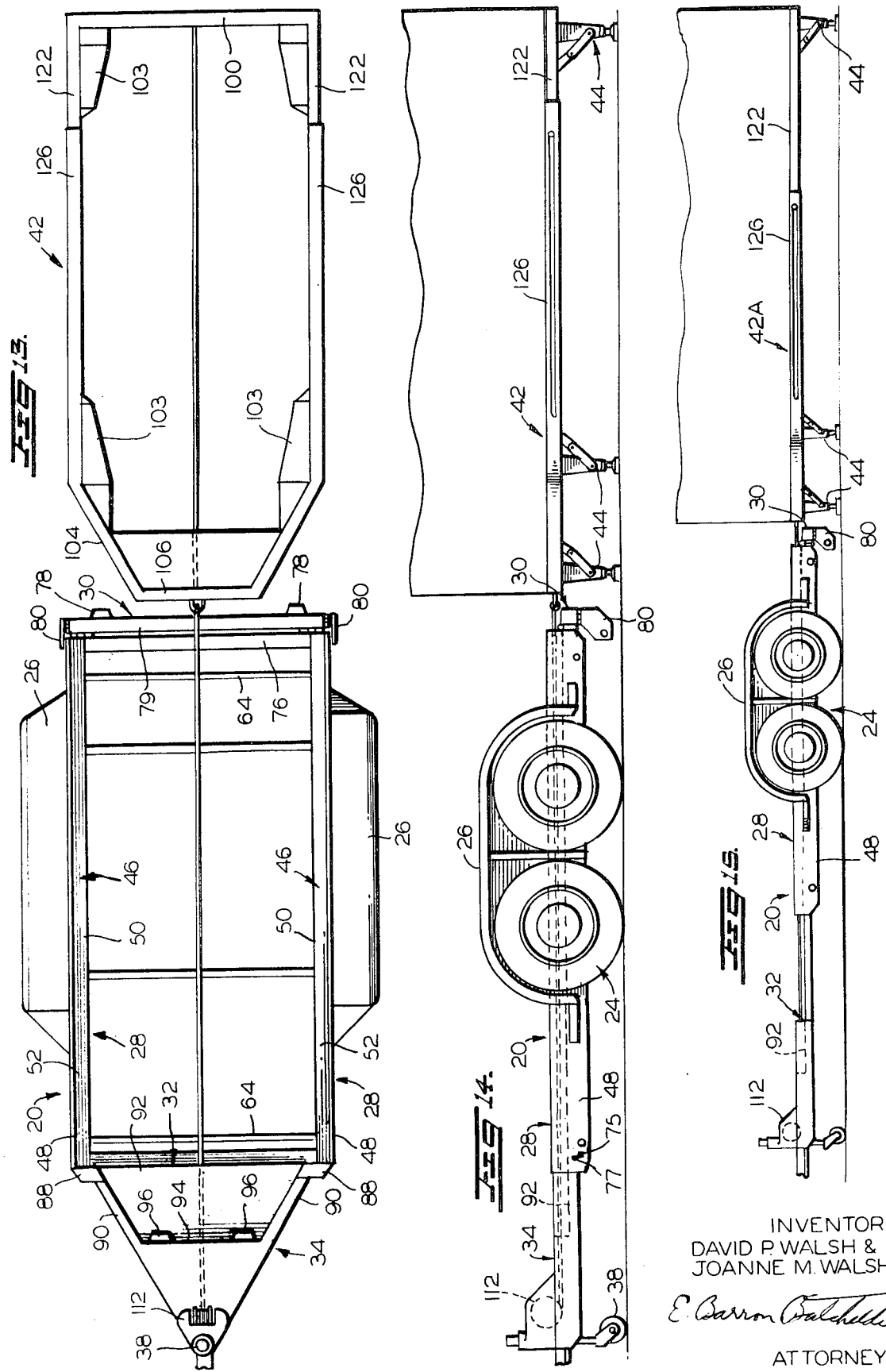

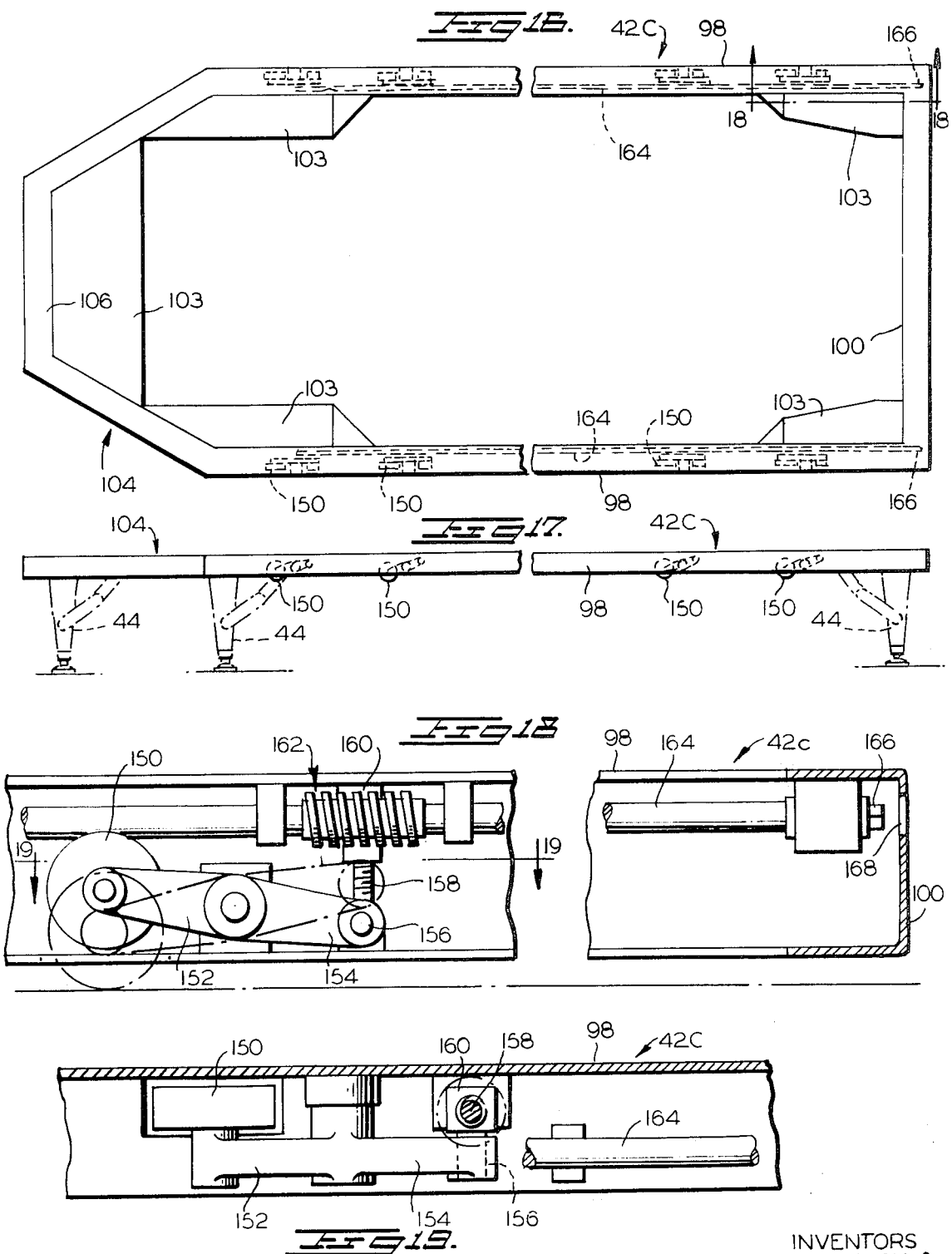

MULTI-TRANSPORT SYSTEM

This is a continuation in part of application Ser. No. 873,001, filed Oct. 31, 1969, titled Trailer Chassis.

BACKGROUND OF THE INVENTION

As is well known trailers of different types are in extensive use, and consist of main chassis which are wheeled and are attachable to a towing vehicle. Many different types of trailer bodies are required to perform different functions such as van-type, camper type or self-contained type unit for recreational or housing facilities, horse or livestock conveying, boat conveyor, open type of bed, modular shipping container, and others. Heretofore each different type of trailer body has been integrated with its main frame or chassis and the resultant structure is limited to a particular use. Since the composite structure comprises an entity it necessitates a license for the individual trailer, as well as severely limiting uses to which that individual trailer might be put. One type of trailer body such as listed above, while being suitable for one purpose does not meet the requirements of the others in a practical manner. From the standpoint of an individual having multiple trailer use requirements in the past necessitated a plurality of separate composite trailer entities, each of which necessitated separate licensing and maintenance. Also, as is well known, the field of trailer rentals is an ever growing one and the same situation applies in that many body types must be acquired, licensed and maintained in order to fill the needs and requirements of the public. It is readily understandable that this entails a very substantial capital investment, also compounding maintenance costs, while decreasing to a great extent percentile of time utilization of the individual units and a consequent reduction of return on initial investment.

SUMMARY OF THE INVENTION

The present invention overcomes the drawbacks of known trailer constructions and for the first time provides a multi-use transport system wherein a main chassis or frame for a trailer can be used for multiple usage by association therewith of interchangeable types of trailer bodies. The individual interchangeable type trailer bodies are each provided with substantially identical sub-frames, and each of these sub-frames is so constructed and interrelated with the construction of the main trailer chassis frame as to be selectively interengageable whereby each body type can be utilized with a common main trailer chassis frame.

The main chassis frame and the substantially identical sub-frames mounting the different body types are so constructed that they may be interengaged to form a rigidified and strong overall composite trailer unit, and preferably have elongated A-shape frame configurations, either or both of which are extensible, and when interengaged substantially total support and interfixation result.

In accomplishing this result, the main chassis frame has as a feature a bed or recess of generally A-shape which permits the sub frame to be mounted wholly contained therein. The sub frame includes a mating generally A-shape and the configuration serves to provide support in a load bearing manner substantially the entire length and structure of a body mounted thereto. The mating arrangement of main chassis frame and sub-frame gives load bearing support for the entire sub-frame and therefore substantially the entire body is given support and strength. In dismounted or detached condition the A-shape of the sub-frame gives substantially total load bearing support to the body unit.

The sub-frames for the different body types, as affixed to the bodies accordingly lend strength to the bodies not only for mounting on the main trailer chassis but when detached render body rigidification and strength, which facilitates storage and or utilization of the individual particular body types as usable items such as storage containers, portable living quarters, boat storage etc.

The main trailer including the wheeled main chassis, subsequent to initial licensing, can be used with any of the body units or types merely by inserting or mounting the same on the main trailer through coaction between the body sub-frame and the mating and coacting structure of the trailer frame. Additional licensing for the different type bodies is eliminated, and initial costs involved to provide desired body types are greatly reduced, plus providing for superior versatility of componant usage to a private owner and to, for example, rental agencies, companies involved in multiple phases and types of transportation, etc.

Other and additional advantages and features of the invention become more readily apparent from the following detailed description of preferred embodiments thereof when taken together with the accompanying drawings in which:

FIG. 1 is an exploded perspective view of a trailer main chassis in a retracted condition and with a body sub-frame spaced from the trailer chassis;

FIG. 1A is a fragmentary perspective view showing a sub-frame receiving bed or recess of the main chassis;

FIG. 2 is a view similar to FIG. 1 showing the trailer chassis extended to receive a larger body frame unit sub-assembly, FIG. 3 is a side elevational view of a retracted trailer chassis having a van-type body and body frame unit in nested and secured position;

FIG. 4 is a side elevational view with the chassis of the trailer extended and having a camper body mounted thereon;

FIG. 5 is a transverse detailed sectional view taken on line 5—5 of FIG. 1 with a body and body frame unit or sub-assembly shown in phantom lines;

FIG. 6 is an enlarged detailed fragmentary sectional view taken along line 6—6 of FIG. 1;

FIG. 7 is an enlarged fragmentary sectional view taken along 7—7 of FIG. 5 with the trailer chassis in retracted position;

FIG. 8 is a view similar to FIG. 7 showing the trailer chassis component in an extended condition;

FIG. 9 is an enlarged detailed fragmentary sectional view taken along line 9—9 of FIG. 7 showing one side of the trailer chassis and means for extending or retracting the chassis trailer frame;

FIG. 10 is a fragmentary top plan view of one side of the rear portion of a trailer chassis detailing locking means for hinged closure means;

FIG. 11 is a perspective view of an extensible body frame unit or sub assembly, an extended position shown in broken lines, and with retractable support legs in ground engaging position;

FIG. 12 is an enlarged transverse fragmentary sectional view taken along line 12—12 of FIG. 11;

FIG. 13 is a top plan view of a retracted trailer chassis and a body frame unit or sub-assembly in position for nesting;

FIG. 14 is a side elevational view of the structure of FIG. 13;

FIG. 15 is a view similar to FIG. 14 showing the trailer chassis in a partially extended condition for receiving a larger body unit;

FIG. 16 is a top plan view of a modified form of body frame or sub-assembly including means to facilitate nesting of a body frame on a trailer frame chassis;

FIG. 17 is a side elevational view of the structure of FIG. 16 with the frame shown in an extended position;

FIG. 18 is an enlarged detailed fragmentary sectional view taken along line 18—18 of FIG. 16 showing one of the conveying rollers in a retracted or 'stowed' position; and FIG. 19 is a longitudinal detailed fragmentary sectional view taken along line 19—19 of FIG. 18.

Referring now in more detail to the drawings, a trailer chassis 20, generally indicated, is shown and which is adapted to receive different types of modular body units. A van type body unit 22 is shown in FIG. 1. The trailer chassis 20 is mounted on or supported by tandem type wheel structure, or the like, generally indicated at 24 appropriately secured to the trailer chassis. Fenders 26 while normally provided can be omitted or modified dependent upon the type of body unit to be placed on the trailer chassis as will appear hereinafter. The trailer chassis includes a substantially rectangular or box shaped frame portion 28 composed of generally, longitudinal members 29 with interconnecting transverse rear member 30 and transverse front member 32, the details of which will be elaborated upon hereinafter. A forwardly extending A-frame portion generally designated 34 is appropriately mated at front member 32 as a frame extension, the A portion serving the usual function for trailer maneuverability. Also as is normal a ball hitch 36 of a conventional socket type and a conventional type of retractable support wheel 38 are appropriately secured at the front end of A frame portion 34 which also serves as the trailer tongue. The support wheel serves a normal function of support means for the forward portion of the trailer chassis when detached from a towing vehicle. Transverse members, generally, 40 interconnect longitudinal members 28 for strength and rigidity of the trailer chassis and or frame.

A trailer chassis 20 due to its construction described in detail hereinafter is adapted to receive and mount in a secure manner different modular body types or styles such as the van type 22 of FIG. 1, a mobile home or camper 22A (FIG. 4) boat trailers, horse trailers, flat beds, etc., for different trailer purpose usages.

Additionally and of significance in the present invention is the capability of the trailer chassis to be extended in length so as to mount, nest and support body units sometimes hereinafter referred to as modular units, not only of different types and configurations but also of different longitudinal lengths or sizes. Each of the modular units has secured thereto as an integral component a body frame unit or sub-frame, generally indicated at 42 in, for example, FIG. 1. The body frame unit or sub-frame 42 can be of fixed dimensions longitudinally for mounting and securement to a body such as the van type 22 etc., or can be of an extensible construction similar to an extensible trailer chassis frame construction for mounting different lengths of bodies and accomodated by different extended lengths of a trailer chassis frame. Sub-frame 42 has preferably attached thereto a plurality of retractable legs 44 adapted to support the sub-frame and a body thereon in ground support position as shown in FIG. 1. When mounted on the trailer chassis, the legs are retracted to inoperable positions.

The sub-frames 42 and a trailer chassis frame are so constructed and designed for interrelated coacting operative interengagement selectively of different body types mounted on the sub-frames in nested substantially completely supported, and positively secured and anchored positionment. The sub-frame is so constructed and shaped as to provide enhanced support to a body mounted thereon, and in conjunction with the trailer chassis extends the support area and capabilities compatible with optimum trailer design. This is accomplished in a manner hereinafter described.

Referring now in more detail to a preferred trailer chassis frame construction, the longitudinal members 28 consist of composite side rails 46 structurally related to and connected to the wheel structure 24 in fixed relation thereto. Included into the composite side rails, respectively, is a face plate member 48 (FIGS. 6-9) to which is attached a box or inwardly opening U-shaped channel 50 which serves as a mount for extensible trailer chassis frame components, and superposed thereabove is an upper inwardly opening channel 52 adapted for mating securement of sub-frames 42 in nested relation. The upper channel is formed between the upper surface of U-shaped channel 50 and the inner wall of face plate member 48. Securement of a sub-frame is accomplished by securement means hereinafter described. Mounted within channel 50 are a plurality of box beams 54 having slots or openings 56 in the bottom thereof. Movably mounted, either slidingly or by means of rollers, within the box beams 54, are open bottom box girders 58 interiorly supporting in a fixed manner a toothed rack 60. Pinion gears 62 are mounted on rotatable shafts 64 at each side of the trailer frame. An end of shaft 64, as shown at 66, is so configured for engagement by a wrench or crank 68 for rotation of shaft 64 and pinion gear 62 therewith. Shaft 64 is rotatably journalled and mounted by means of housing and bearing assembly generally indicated at 70. The forward ends of box beams 54 are preferably closed by means of L-shaped apertured members or rails 72, constituting a front transverse member, generally 40. Z-shaped member 74 of slightly greater dimensions is provided on the extensible portion for mating arrangement with the trailer frame L-shaped member 72 in retracted position and for securement of the front ends of members 58. Mateable openings generally indicated at 75 are provided in longitudinal members 28 and the members 58 for coacting with locking pins or the like 77 to lock the trailer chassis frame components in retracted condition and when removed permit frame extension.

A transverse member 76 is positioned at and across the rear ends of box 58 and pivotally supports at 60 a transverse box beam 79. In campers, for example, hollow bumpers such as at 79 are normally used for containment of sewage disposal hose or conduits to connect a trailer sewage system to a commercial disposal system in a trailer park or the like. When raised to the position shown in FIGS. 1, 2 and 9, for example, this constitutes a closure and securing means through modular or subframe retainer lugs 78 having lower substantially horizontal surfaces and upper angularly disposed surfaces, for purposes hereinafter to be described. The member 30 serves the purpose of a bumper, and additionally securement means for a body mounted on a subframe in a nested position on the trailer chassis. Securement means for the bumper in raised subframe securing relationship is shown in FIG. 10 including a hinged plate 80 attached to bumper 79 by plate 82. The hinged plate 80 additionally serves as a closure for the bumper members 76, 79 open ends and for containment of the disposal hose when not connected into an external disposal system. Securing pins 77 are used for locking the hinged closure means for the bumper and retainer lugs thereon as well as interlocking the frames in extended and retracted positions.

Forward ends of the front box girders 58 have attached thereto the A-frame portion generally indicated at 34 and which includes structure defining what might be termed a truncated A frame portion at 86 with rear transverse ends at 88 adapted for mating engagement with the forward ends of the longitudinal trailer chassis frame members. The A-frame is composed of merging channel members 90 and interconnecting base plate 92. The plate 92 and inner surfaces of channels 90 form an engaging and supporting seat for the leading end of a nested and mated body sub-frame when mounted on the trailer chassis frame. The inner front member of the truncated A-frame, comprising a transverse beam 94 has spaced retainer lugs 96 extending therefrom of similar nature with the lugs 78 at the rear of the trailer chassis frame.

From the foregoing it will be seen that the trailer chassis frame forms a bed or recess B between the side members 28 thereof, and extending to the interior of truncated A-frame portion 86 and this is adapted to receive, nest and matedly attach sub frame 42 therein. The top surface of base plate 92 is coplanar with the top support surfaces of channels 50. The sub frame 42 is thereby given bearing support over its entire bearing lower surface, and the body unit is given support along substantially its entire length by the coextensive support areas of the chassis and sub-frame. Unsupported body overhang is thereby eliminated in the present construction. The bed B is better seen from FIG. 1A. By virtue of the construction as described including the rack and pinion and associated mechanism, the trailer chassis frame can be extended fore and aft of the intermediate portion thereof attached to and supported by the wheels, while maintaining a nesting bed for a modular unit sub-frame. The inner surfaces of the members forming the bed constitute sliding and support surfaces for insertion or removal of a sub frame 42 therein or therefrom. The retainer lugs with their lower horizontal surfaces and the upper and end surfaces of angular configuration provide camming surfaces for proper orientation and insertion into the frame structure of the sub frame units of the various modular units to be hereinafter described. The sub frame 42 can be made with lengths commensurate with the dimensions of a body type to be secured thereon, but for different lengths have a substantially identical structure. This structure includes longitudinal side rails 98 preferably of U-shape interconnected at their rear ends by transverse channel 100 and reinforcing and body supporting gusset plates 103. Transverse member 100 is provided with elongated openings 102 therein for mating engagement with retainer lugs 78 when in nested relation of the sub-frame and trailer chassis bed.

The forward end of the sub-frame 42 is truncated A frame configured as at 104 similar to the interior of A frame 86 and of substantially equal dimensions therewith. The forward end of the A frame consists of a transverse member 106 having openings 108 therein for mating engagement with retainer lugs 96. A hook or eye member 110 is also attached to transverse front member 106 and serves to facilitate mounting and nesting of sub-frame 42 in the bed provided by trailer chassis as before described.

From the foregoing description it will be apparent that the trailer chassis is so constructed as to form an extensible length supporting and nesting bed for sub-frames of different lengths, but substantially identical configurations, and that the sub-frames can be easily and readily moved into position in the chassis frame bed B, with the rear bumper lowered, and utilizing any tractive or drawing means in conjunction, for example, with eye 110 to draw the sub-frame and body into forward nested positionment. The retaining lugs are then engageable both at the front and rear ends of the sub-frame, and hold and secure the sub-frame and body thereon from vertical dislodgement or other disengagement.

A winch and cable assembly is generally indicated in FIGS. 13 and 14 at 112, with the cable engaging eye 110. The upper surface of channels 50 can constitute slides to facilitate mounting of the sub-frame or removal from the trailer chassis frame. In a further embodiment which will be described with reference to FIGS. 16-19 rollers can be provided to facilitate mounting or removal of the sub-frame and eliminating problems of friction or binding. When mounting a sub-frame and body thereon which requires extension of the main chassis frame, the sub frame is first brought into position in bed or recess B and the front lock consisting of the lugs 96 and openings 108 are lockingly engaged. Thereafter pins 77 are removed and upon further forward movement of the sub frame the main chassis frame extends by extension of the side frame members. The front and rear lugs by virtue of their camming surfaces transmit load forces and serve to secure and tie down the sub frame fore and aft and impart rigidity to the frames when extended.

Referring to FIGS. 3, 4, 7 and 8 a pulley 113 is mounted at the rear of the extensible chassis frame on transverse member 76 and serves to aid in removing a sub-frame by passing a cable from winch 112 under the chassis frame and attaching to the rear of the said frame. This can be effected with the main chassis frame partially extended, FIG. 8, and locked, and the winch then draws the sub frame out of the main chassis frame.

As pointed out hereinabove, FIG. 1 shows the trailer chassis retracted position and mounting a van type body whereas FIG. 2 discloses the trailer chassis in extended position adapted for mounting a camper body or the like of longer length. FIG. 3 again discloses a van type body 22 FIG. 4 shows the camper body mounted on the trailer chassis as extended as shown in FIG. 2.

FIG. 11 shows in greater detail a modified form of sub-frame at 42A. The rear portion of the sub frame in this embodiment consists of, as generally indicated at 120, longitudinal channel members 122 connected by rear transverse member 124, with the members 122 slidably mounted in longitudinal channel members 126 of the front or A-shaped portion 128 of larger dimensions. An elongated slot such as at 130 is provided in each of the longitudinal members 126 and bolts or the like 132 extend through the slots and holes in the longitudinal member 122. This construction permits sliding of the front and rear portions of the sub-frame with respect to one another, with the retracted position shown in full lines and extended position in broken lines. The remainder of the sub-frame construction and functioning is substantially identical with those hereinbefore described, but adds the feature of extensibility of the sub frame as well as extensibility of the trailer chassis frame, for greater versatility in adapting the overall structure to different styles and sizes of bodies to be mounted on the trailer.

Supporting leg structures are shown in a preferred form in greater detail in FIGS. 11 and 12 wherein leg portions 134 are pivotally supported at 136 to the rear and front sub frame portions 120, 128 respectively. A foot 137 is mounted on a threaded bolt 138 or the like which is threadedly engaged in a threaded socket 140, permitting vertical adjustment of the foot for levelling and ground engagement functions. An over center locking lever arrangement 142 is provided for locking the legs in vertical position as shown in full lines for supporting the sub-frame and accordingly a body supported thereby.

FIG. 13 shows in top plan a retracted trailer chassis and body sub-frame in a position for and prior to nesting. FIG. 14 shows in side elevation details of FIG. 13, and FIG. 15 shows the trailer chassis in a partially extended condition to receive a larger body unit. The sub-frame assembly shown in FIGS. 13-15 correlates with that shown and described with respect to FIGS. 11 and 12.

FIGS. 16-19 show a further embodiment of sub frame construction generally indicated at 42C. In this embodiment support rollers 150 are journalled on one end of pivotally mounted arms 152, adapted for movement from a retracted position shown in full lines in FIG. 18 to an extended position shown in broken lines at which time the rollers are adapted for rolling engagement with the trailer chassis frame to facilitate placement of or removal of the sub-frame on the trailer chassis frame. The rear end 154 of arm 152 mounts a pin 156 which at its end has a screw 158 which extends upwardly into a threaded bearing or the like 160, which is operatively rotatable by means of worm and worm wheel 162 mounted on shaft 164 having an end 166 adapted for engagement by a wrench, crank or the like and accessible through opening 168 at the rear of the sub frame. Upon rotation of shaft 164 the screw 158 will operate to move the arm 152 in such direction as to raise or lower (extend or retract) rollers 150 for desired operation.

In embodiments consisting of self-contained campers for example, greater body widths are encountered. Trailer bodies might for example be 6 feet in width whereas self-contained campers might be 8 feet. Fenders when used are approximately 10 inches to 1 foot each so that total width approximates 8 feet for trailer bodies. For campers wheel recesses can be used and with the same sub frame concept this unit is mountable on the same chassis frame, while retaining the features of the invention and preserving a low center of gravity.

The main trailer chassis and the body unit, including its sub frame, are preferably designed to include all necessary desired wiring for operating as self contained units, with separable interconnect means, such that the trailer is separately operable when connected to the electrical system of a towing vehicle and the body unit wiring and utilities are operable from the trailer chassis wiring system or from an outside power supply source when the body unit is removed for use apart therefrom as a self contained unit.

From the illustrated and described embodiment of the invention it will be seen that great versatility of trailer chassis utilization is provided while substantially reducing initial costs, inventory costs, maintenance costs, etc., and at the same time providing a completely safe operating unit for all combinations which might be effected.

Manifestly minor changes in details in construction can be effected without departing from the spirit and scope of the invention as defined in and limited solely by the appended claims.

I claim:

1. A multi-use transport system comprising:
   A. a trailer having a main chassis frame;
   B. a plurality of interchangeable type trailer bodies, each having a substantially identical sub-frame mounted thereto;
   C. said main chassis frame including a recessed upwardly open sub-frame receiving and supporting bed, open at one longitudinal end for receiving a sub-frame therethrough for relative displacement to and from nesting relation of the respective sub-frames;
   D. said sub-frame constituting a closed frame assembly secured to a said body as an integral entity therewith, imparting strength and rigidity to the composite body and sub-frame for independent use thereof separate from said trailer chassis frame and assembled strength when mounted thereon;
   E. said sub-frames and said main chassis frame being interrelated and designed for coacting operative interengagement selectively of each said body type sub-frame and body thereon on said main chassis frame, with:
      i. said main chassis supporting bed and said closed frame of said sub-frame being of substantially equal mating dimensions and having substantially identical matable truncated A-shaped head portions such that in nested relationship said sub-frame is supported substantially coextensively by and on said main chassis frame, and
      ii. said matable truncated A-shaped head portions of said main chassis frame and said sub-frame having mating interacting positioning, retaining, and securing lugs and openings engageable in load transfer relationship upon relative movement of the frames into nested positionment, and wherein lateral forces are transferred additionally by interaction of the A-shaped head portions.

2. A multi-use transport system as claimed in claim 1, a pivotally mounted main chassis frame open end closure member, said closure member and the mating end of said sub-frame having mating interacting positioning, retaining and securing lugs and openings engageable in load transfer relationship upon pivoting of said closure member to end closing position, and in end open position permitting relative displacement of the frames into and out of nesting positionment.

3. A multi-use transport system as claimed in claim 2, said end closure member constituting in part a rear bumper for said trailer.

4. A multi-use transport system as claimed in claim 1, wherein said main chassis frame and said sub-frame are engageably slidable for the relative displacement to and from nesting relation.

5. A multi-use transport system as claimed in claim 1, including a plurality of extensible and retractable rollers mounted on said main chassis frame operable for rolling conveyance of a sub-frame for the relative displacement to and from nesting relation.

6. A multi-use transport system as claimed in claim 1, said main chassis frame having extensible and retractable longitudinal side members whereby different length sub-frames can be nestingly mated thereon.

7. A multi-use transport system as claimed in claim 1, said main chassis frame having longitudinal side members including opposed inwardly opening box type channels and said subframe including box type beams engageable in said channels for relative longitudinal displacement therebetween and secured confinement in nested relation.

8. A multi-use transport system comprising:
A. a trailer having a main chassis frame;
B. a plurality of interchangeable type trailer bodies, each having a substantially identical sub-frame mounted thereto;
C. said main chassis frame including a recessed upwardly open sub-frame receiving and supporting bed, open at one longitudinal end for receiving a sub-frame therethrough for relative displacement to and from nesting relation of the respective sub-frames;
D. said sub-frame constituting a closed frame assembly secured to a said body as an integral entity therewith, imparting strength and rigidity to the composite body and sub-frame for independent use thereof separate from said trailer chassis frame and assembled strength when mounted thereon,
E. said sub-frames and said main chassis frame being interrelated and designed for coacting operative interengagement selectively of each said body type sub-frame and body thereon on said main chassis frame, with:
  i. said main chassis supporting bed and said closed frame of said sub-frame being of substantially equal mating dimensions and having substantially identical matable truncated A-shaped head portions such that in nested relationship said sub-frame is supported substantially coextensively by and on said main chassis frame;
  ii. said main chassis frame having extensible and retractable longitudinal side members whereby different length sub-frames can be nestingly mated thereon; and
  iii. said sub-frame closed frame assembly having extensible and retractable longitudinal side members whereby different lengths and types of trailer bodies are mountable thereto.

9. A multi-use transport system as claimed in claim 8, wherein said longitudinal side members of said main chassis frame and said sub-frame are extensible fore and aft for load support balance.

10. A multi-use transport system as claimed in claim 8, said longitudinal side members of said main chassis frame including outer open bottom box beams longitudinally movably mounted in said open bottom box beams and having rack means thereon, and pinions extending partially through said open bottom engageable with said rack means and operable for extending and retracting said inner box beams in said outer box beams.

* * * * *